(12) United States Patent
Waterman

(10) Patent No.: US 11,436,377 B2
(45) Date of Patent: Sep. 6, 2022

(54) SECURE WORKLOAD IMAGE DISTRIBUTION AND MANAGEMENT

(71) Applicant: NCR Corporation, Atlanta, GA (US)

(72) Inventor: Simon Waterman, Somerset (GB)

(73) Assignee: NCR Corporation, Atlanta, GA (US)

( * ) Notice: Subject to any disclaimer, the term of this patent is extended or adjusted under 35 U.S.C. 154(b) by 274 days.

(21) Appl. No.: 16/913,474

(22) Filed: Jun. 26, 2020

(65) Prior Publication Data

US 2021/0406409 A1 Dec. 30, 2021

(51) Int. Cl.
| | |
|---|---|
| *G06F 21/78* | (2013.01) |
| *H04L 9/32* | (2006.01) |
| *G06F 16/51* | (2019.01) |
| *G06F 21/62* | (2013.01) |

(52) U.S. Cl.
CPC .............. *G06F 21/78* (2013.01); *G06F 16/51* (2019.01); *G06F 21/6209* (2013.01); *G06F 21/6227* (2013.01); *H04L 9/3247* (2013.01)

(58) Field of Classification Search
CPC ...... G06F 21/78; G06F 16/51; G06F 21/6209; G06F 21/6227; G06F 21/64; H04L 9/3247
See application file for complete search history.

(56) References Cited

U.S. PATENT DOCUMENTS

| | | | | |
|---|---|---|---|---|
| 10,114,969 | B1 * | 10/2018 | Chaney | .................. G06F 21/64 |
| 10,218,684 | B2 * | 2/2019 | Black | ................. H04L 63/0435 |
| 2002/0112171 | A1 * | 8/2002 | Ginter | .................... G06Q 40/04 |
| | | | | 375/E7.009 |
| 2019/0028278 | A1 * | 1/2019 | Gilson | .................... H04L 9/088 |

FOREIGN PATENT DOCUMENTS

| | | | | | |
|---|---|---|---|---|---|
| CN | 100405795 | C | * | 7/2008 | ....... G06F 17/30094 |
| CN | 105678189 | A | * | 6/2016 | ....... G06F 17/30094 |
| CN | 107770115 | A | * | 3/2018 | ......... G06F 16/1834 |
| CN | 109243583 | A | * | 1/2019 | ............. G06F 21/64 |
| CN | 109791594 | A | * | 5/2019 | ......... G06F 12/1408 |
| WO | WO-2019040713 | A1 | * | 2/2019 | ......... H04L 65/4076 |

* cited by examiner

*Primary Examiner* — Sher A Khan

(74) *Attorney, Agent, or Firm* — Schwegman, Lundberg & Woessner

(57) ABSTRACT

Workload Images comprising one or more artifacts are managed in a decentralized and centralized manner. Local management comprises breaking any image/artifact into blocks, encrypting each block with a key known and available only to the local processing environment, and uniquely signing each encrypted block. Published versions of the images/artifacts are retained remotely in a cloud/server in encrypted and signed block format. When retrieval, modification, addition, deletion, and deployment of any given image/artifact is needed, the target device/server that is to receive the image/artifact provides a listing of encrypted blocks with the corresponding signatures that are already present on that device/server and a centralized cloud/server schedules and manages download of just those encrypted blocks that are missing to the target device/server. The target device/server assembles and installs the image/artifact using the downloaded blocks received from the cloud/server and the existing blocks already present on the target device/server.

9 Claims, 4 Drawing Sheets

SECURE WORKLOAD IMAGE DISTRIBUTION AND MANAGEMENT

BACKGROUND

Many enterprises have moved management, storage, and in some cases execution of software-based resources and data storage to cloud environments. This frees the enterprises to focus on their core competency relevant to their business. However, cloud-based software execution can reduce response times, expose an enterprise to unwanted security vulnerabilities, violate governmental compliance, and relinquish control over enterprise assets/trade secrets. Moreover, even when an enterprise elects to proceed with a complete cloud-based infrastructure that enterprise still needs properly configured hardware devices in order to access their cloud-based infrastructure.

Thus, regardless of the level of cloud integration that any enterprise deploys, the enterprise still needs to administer and manage its on-site hardware devices and whatever software, which is needed to make the devices operational. In order to ensure that: the devices are not used improperly by employees, do not become inoperable because of unintended software downloaded and installed on the enterprise devices, and do not become inoperable due to viruses or even innocuous software that interferes with the operation of the enterprise software, many enterprises maintain a good working copy of the enterprise's hardware/software configuration settings and software executables.

An enterprise can have many types of business-related devices, which can be geographically dispersed across multiple sites. Each site may have its own hardware and software configuration needs. Configuring the hardware and installing the software on these devices can be an incredibly time-consuming process, which necessitates skilled staff.

As a result, enterprises maintain the configurations and software based on the types of devices and needs of any given site of a given enterprise and administer the configurations and software as machine images. Many enterprises attempt to administer and maintain these machine images over network connections, which alleviates the need to have skilled staff being required to be physically present at each machine to perform updates, upgrades, and/or maintenance in person. However, often this is not feasible because the size of the machine images are so large that they are incompatible with the enterprise's available network bandwidth, take too long to download on the machines, take too long for the machines to install once downloaded, and/or interfere with critical business-related bandwidth.

Consequently, many enterprises are unable to successfully administer machine images over network connections because critical compliance-related security software updates, bug fixes, and/or newly developed product offerings cannot be installed on the machines within required and/or reasonable time frames utilizing network connections.

SUMMARY

In various embodiments, methods and a system for secure workload image distribution and management are presented.

According to an aspect, a method of secure workload image distribution and management is presented. Specifically, A workload image or an artifact is identified. The workload image or the artifact is broken into blocks. Each block is encrypted as an encrypted block. A unique signature is generated for each encrypted block as an encrypted-signed block. A list is maintained, the list comprising the encrypted-signed blocks. The list is provided to a server or a cloud for managing distribution of the workload image or the artifact to devices and installation by the devices of the workload image or the artifact as a workload or an executing instance of the artifact.

DETAILED DESCRIPTION

Figure 1:
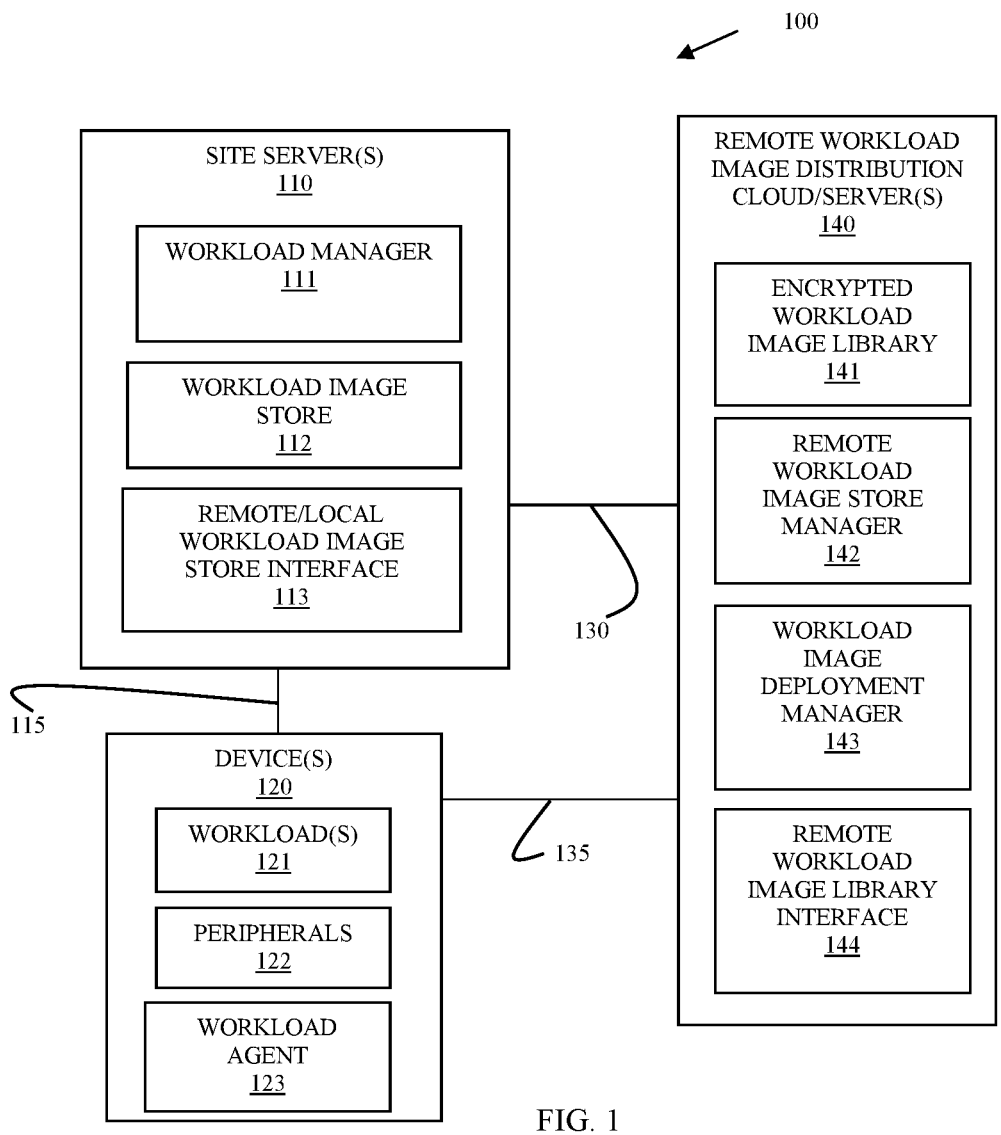
FIG. 1 is a diagram of a system for secure workload image distribution and management, according to an example embodiment.

FIG. 1 is a diagram of a system 100 for secure workload image distribution and management, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of secure workload image distribution and management presented herein and below.

The system 100 provides a secure network-based technique for managing, distributing, and installing workloads. As will be discussed in greater detail herein and below, the system 100 permits workload images to be created and tested at enterprise sites by the enterprise. The workload images are then encrypted at the enterprise sites, broken into configurable sized blocks/chunks (portions), and a unique digital signature is generated for each block. For any given workload image that an enterprise changes or creates, the corresponding enterprise site sends a list of block identifiers and their corresponding signatures to a remote server/cloud-based server. The remote server compares the block identifiers and the corresponding assigned signatures against a library of workload blocks and signatures maintained for the site. Any new block or block having a different signature from what is included in the library is flagged by the remote server. The remote server then requests that the site server send the specific new blocks or the specific modified blocks, which were not included in the library, to the remote server. The actual encrypted data for the requested blocks are then sent by the site server to the remote server. The remote server updates the workload image in the library with the new or modified blocks. When machines/devices at the site are to receive any given workload image, the remote server sends the corresponding site-encrypted workload image blocks representing the delta in the existing workload image that is already deployed on that device over the network to the device. An agent on the device, then decrypts and installs the delta workload image blocks on the device.

It is noted that the approach is fully customizable and controlled by the enterprise because only the enterprise retains the encryption/decryption keys, each site of an enterprise, each machine at a given site, and/or each enterprise can customize the encryption/decryption key. Furthermore, the size of the blocks and the manner in which a given image is broken into blocks is customizable by the enterprise. Moreover, a schedule and network bandwidth requirements for deployment of a workload image can be customized and specific to the enterprise, a given site of an enterprise, and/or a given machine of a given site.

There are a variety of embodiments discussed herein and below to the aforementioned technique.

The system 100 includes a plurality of site servers 110, one or more machines/devices 115 managed by a corresponding site server 110, and remote workload image distribution cloud server(s) 140.

Each site server 110 comprises a workload manager 111, a workload image store 112, and a remote/local workload image store interface 113 (hereinafter "workload image store interface 113," "image store interface 113," "local image store interface 113," or "image interface"). Each site server 110 also comprises one or more hardware processors and a non-transitory computer-readable storage medium having executable instructions representing workload manager 111 and remote workload image store interface 113. The executable instructions when executed by the one or more processors from the non-transitory computer-readable storage medium cause the one or more processors to perform the processing described herein and below with respect to workload manager 111 and remote workload image store interface 113.

Each device 120 comprises one or more workloads 121, one or more interfaced peripheral devices 122 (peripherals 122), and workload agent 123. Each device 120 also comprises one or more hardware processors and a non-transitory computer-readable storage medium having executable instructions representing workloads 121 and workload agent 123. The executable instructions when executed by the one or more processors from the non-transitory computer-readable storage medium cause the one or more processors to perform the processing described herein and below with respect to workloads 121 and workload agent 123.

Remote workload image distribution cloud/server 121 comprises an encrypted workload image library 141, remote workload image store manager 142, workload image deployment manager 143, remote workload image library interface 144 ("remote library interface 144," "remote interface 144"). Remote workload image distribution cloud/server 140 also comprises one or more hardware processors and a non-transitory computer-readable storage medium having executable instructions representing remote workload image store manager 142, remote image deployment manager 143, and remote workload image library interface 144. The executable instructions when executed by the one or more processors from the non-transitory computer-readable storage medium cause the one or more processors to perform the processing described herein and below with respect to remote workload image store manager 142 workload image deployment manager 143, and remote workload image library interface 144.

As used herein a "workload" 121 is a virtual machine (VM), a container, and Operating System (OS), and/or a customized set of software executables along with hardware settings, software settings, data files, and/or peripheral settings associated with peripherals.

An "image" refers to hardware and software settings, data files, and executable instructions that are packaged in a predefined sequence, format, and order permitting the contents of the image to be decompressed, formatted, installed, and executed on a machine/device 120 as a workload 121.

A "golden image" is a primary, standard, or base image from which a variety of other images are derived, cloned, or modified.

"Artifacts" comprise software applications, software application updates, OS's, OS updates, International Standard Organization (ISO) settings, Windows® Image Format (WIM) files, peripheral drivers, peripheral driver updates, and/or any software-based media, standards, settings, and/or data files.

A developer/user of a given enterprise can perform a variety of image-related operations with system 100. Two primary operations comprise 1) modifying an existing workload image and/or artifact of the existing workload image, and 2) creating a new workload image with a new artifact. It is noted that in 1) a new artifact may be added to an existing workload image. It is also noted that in 1) an existing artifact may be deleted or removed from the existing workload image.

A given enterprise maintains golden images in a workload image store 112 having artifacts of the enterprise. In 1) a developer utilizes remote workload image store interface 113 to locate an existing image or a given artifact of an existing image when a modification is being made to the image. Locating the existing image through remote workload image store interface 113 may also be used when a new artifact is being added to the existing image. Workload image store 112 maintains metadata for each image and each artifact contained in one or more images. The images and artifacts are also stored in encrypted and, optionally, compressed format. If the needed image and/or artifact is not locally stored in the image store 112, workload image store interface 113 requests the image or artifact from remote workload image library interface 144 over a network connection 130 (wired, wireless, or a combination of both wired and wireless). Remote workload image library interface 144 interacts with remote workload image store manager 142 and stores golden images having any needed artifacts in encrypted format within encrypted workload image library 141, and remote workload image store manager 142 utilizes image/artifact/block identifiers and/or indexed metadata to locate the requested existing workload image or artifact of the existing workload image. Again, the workloads are stored in encrypted and, optionally, compressed format within encrypted workload image library 141. If the requested workload image and/or artifact is not locally available from workload image store 112, then remote workload image store manager 142 (through interaction with remote workload image library interface 144) obtains the needed encrypted and, optionally, compressed workload image blocks or workload image block having a specific artifact from encrypted workload image library 141 and provides the encrypted blocks to workload image deployment manager 143 for downloading to site server 110 over connection 130 (this download may be immediate (on demand) or may be subject to scheduling restrictions based on bandwidth policy conditions (as discussed below).

In 1) once the existing workload image and/or artifact of a given existing workload image is obtained, workload manager 111 decrypts and decompresses it to provide the corresponding workload and/or artifact within a given workload to the developer. The developer then utilizes existing development tools to modify one or more portions of the existing workload or to modify a given artifact of the existing workload. Existing development tools are then used to test the changes in a simulated production/quality assurance processing environment within site server 110.

When the changes are finalized for production in 1), the developer returns to remote workload image store interface 113 to upload the modified workload and/or artifact of the workload. Workload manager 111 and puts the modified workload (note even if only the artifact was changed the associated workload had to be modified) in an image format as a modified workload image. Workload manager 111 encrypts and, optionally compresses the modified workload image and decomposes the modified workload image into encrypted blocks. Each block assigned a block identifier and each block is digitally signed. A listing for the modified workload image is generated and assigned to the original workload image's identifier along with metadata identifying audit data such as developers identifier, calendar date, time of day, total number of encrypted blocks, a total number of changed blocks from what was known for the workload image before the change, etc. The list comprises the ordered listing of encrypted block identifiers and a corresponding digital signature for each block identifier. The metadata and the list are then sent from remote workload image store interface 113 to remote workload image library interface 144 over network connection 130. Remote workload image store manager 142 searches encrypted workload image library 141 for the workload image identifier and matches to a golden workload image identifier for the corresponding workload that was changed, a golden list is obtained matching the workload image identifier. Remote workload image store manager 142 compares each block identifier and its assigned digital signature provided by remote workload image store interface 113 against the golden lists and its block identifiers and assigned digital signatures. A delta is determined, the delta representing specific block identifiers that have a modified digital signature. The delta is sent back to remote image store interface 113 through remote workload image library interface 144 as a request for the actual encrypted and compressed blocks identified in the delta to be provided from workload image store 112 by remote workload image store interface 113 to remote workload image store manager 142 (via remote workload image library interface 144) over network connection 130. Remote workload image store interface 113 provides just the encrypted and compressed delta-identified blocks back to remote workload image store manager 142. Remote workload image store interface 113 replaces the delta-identified blocks in the encrypted workload image library 141 for the golden workload image.

Notice that very little data is transferred between site server 110 and remote workload image distribution cloud/server 140. The list is merely identifiers with assigned digital signatures along with metadata. The only data of any significant size is the delta-identified encrypted and compressed blocks. Moreover, notice that the delta-identified encrypted and compressed blocks are not in any decrypted format that would be usable to any network sniffer attempting to spy or obtain primary data associated with the encrypted and compressed blocks. In fact, the encryption and decryption keys associated with the blocks are never provided and are completely unavailable to cloud/server 140, such that should cloud/server 140 become compromised through a security breach, the intruder would be unable to decrypt the encrypted blocks to discover any useful data.

Remote workload image store interface 113 may also be used by developer to assign specific devices 120 of the enterprise that are to receive the modified workload, define bandwidth thresholds during distribution of modified workload, and set a schedule for which each device 120 is to receive the modified workload. This information is received from remote workload image store interface 113 by workload image deployment manager 143 to define conditions for which the modified workload is subsequent delivered to the corresponding devices 120 and installed by workload agents 123.

Developer utilizes interface 113 to define bandwidth and/or date-time deployment conditions to deployment manager 143 (via remote workload image library interface 144). Deployment manager 143 contacts workload agent 123 over network connection 135 (wired, wireless, or a combination of wired and wireless) and requests a listing of block identifiers and the corresponding digital block signatures for the workload image on device 120 that corresponds to workload 121 of device 120. Agent 123 provides the list back to deployment manager 143. Deployment manager 143 compares the block signatures against the now modified and new golden workload image's block signatures and determines which specific encrypted and compressed blocks (delta blocks) are needed for device's workload image to be updated as the modified golden workload image. If it is not already known, deployment manager 143 may also request a maximum network bandwidth that is available to device 120 over connection 135.

The delta blocks (or links to the delta blocks) for the modified workload image needed by device 120 are then inserted into a download deployment queue of cloud/server 140 where the delta blocks or the links to the delta blocks for download are delivered to agent 123 when any date/time conditions are satisfied and sufficient bandwidth over 135 is available to satisfy any bandwidth conditions. Once all delivery conditions are met, the delta blocks are sent over 135 by deployment manager 143 or the links to the delta blocks are sent over 135 by deployment manager 143 to agent 123. Agent 123 receives the delta blocks or obtains the delta blocks through the links over 135. Agent 123 may have its own installation conditions, such as install the delta blocks as a modified workload image. Any agent installation conditions may be set by remote workload image store interface 113 over network connection 115 (wired, wireless, or a combination of both wired and wireless) using remote workload image library interface 144. Once agent installation conditions are met, agent 123 installs the modified workload image and initiates modified workload 121 on device 120. Agent conditions may also be set by the developer through workload image store interface 113 over connection 130 with deployment manager 143, deployment manager 143 provides the agent conditions over connection 135 to agent 123.

New workload images in 2) are processed in a similar manner as was discussed above. The new workload image's list of block identifiers and signatures are sent to image store manager 142. Some block identifiers and signatures may already exist in other images maintained within library 141, such that the entire new workload image and its corresponding encrypted and compressed blocks may not be required to be sent from site server 110 to cloud/server 140. The same is true for deployment of that new workload image on device 120. This ensures that even new workload images being deployed may be pieced together on device 120 and ensures that less than all of the encrypted blocks associated with the new workload image will not be required to be sent over network connections 130 and 135.

A variety of specific features and embodiments of system 100 and its components 110-143 are now presented for purposes of further illustration and comprehension.

Storage of workload images and corresponding artifacts are managed both locally at enterprise site servers 110 via a workload image store 112 and remotely from the cloud/server 140 through encrypted workload image library 141. Both store 112 and 141 comprise metadata as discussed above that permits search and retrieval functionality among other things. Specific versions of artifacts can be managed based on the workload image to which they are associated. For example, workload image A may have artifact B version 1 whereas workload image C may have artifact B version 2. A search of the metadata for artifact B version 2 would return and be associated with workload image C and a search of workload image A would return with that image artifact B version 1. The metadata also includes a history of all uploads to library 141 and downloads as well as the user and/or automated application that performed each of those uploads and downloads along with corresponding date and time stamps. The metadata may also include details of a particular workload image or a particular artifact within a particular workload image or within multiple different workload images.

Stores Interface 113 interacts with image store manager 142 and image deployment manager 143 (via remote workload image library interface 144) to provide a variety of user-interface features and interface screens rendered to the developer/user on a device connected to site server 110. For example, the progress of any image and/or artifact download can be monitored from the interfaces 113 and 144 as a graphical and text-based presentation illustrating a current percentage downloaded, current bandwidth download rate over connection 130, and an estimated time to download completion. As another example, a visual and textual representation of the current image and/or artifact download queue may be presented in a rendered screen, the rendered screen may be interacted with through the interfaces 113 and 144 to view historical versions of the download queue and scheduled future but not yet processed versions of the download queue. Screens may be rendered to show any of the aforementioned metadata as well as details of one or more artifacts within one or more workload images associated with a given site server 110. Interfaces 113 and 144 also provide a means for interacting with deployment manager 143 for purposes of viewing and modifying the download queues; for example, to expedite a given download, cancel a given download, and/or pause a given download. Interfaces 113 and 144 provides a means (interface options) for interacting with workload image store manager 142 for uploading artifacts and/or images, including encryption (handled by workload manager 111) and deduplication.

Deployment manager 143 provides dynamic bandwidth throttling for any in-progress download based on current device 120 bandwidth metrics (current bandwidth usage, available unused bandwidth, device maximum bandwidth capability, etc.), current site server 110 bandwidth metrics, and/or enterprise set bandwidth thresholds/conditions.

Various other embodiments of system 100 are now discussed within the context of specific use cases.

Upload of a New Golden Image for Production Deployment within an Enterprise

This use cases assumes that the user has created a new artifact that is to be used to bootstrap a new VM (one type of workload) in a production environment; the artifact is available on site server 110 and cloud/server 140; the artifact includes security sensitive information to the enterprise; the artifact is large in data size (such as 30 GB or larger) and would benefit from deduplication.

1. The user specifies metadata about the artifact in a metadata file, including image name, version and description through interface 113.

2. User selects an interface option to run an upload utility with workload manager 111 on site server 110 and specifies the upload image, metadata file and a Universal Resource Locator (URL) link to a library where the upload image for the artifact can be obtained by workload manager 111.

3. User enters a passphrase for their production encryption key so that the image can be encrypted for production use by workload manager 111 within image store 112.

4. User enters username and password (note that an upload certificate may also be used to authenticate the connection to the image store 112).

5. The image file is deduplicated, compressed, encrypted and signed before being uploaded to the image store 112.

6. If requested by command line switch (interface option), upload progress and an estimated time to completion are periodically presented within interface 112.

7. Once complete the image appears in the list of uploaded images, together with its metadata, the user identifier for the user who uploaded it, the date and time that the upload completed, and the file size.

User Resumes a Failed or Interrupted Upload

This use case assumes the user has started the upload of an artifact, but the upload failed due to a network problem.

1. User runs the upload utility on site server 110 and specifies the upload image and a library URL plus a flag to indicate the upload should be resumed.

2. User enters their username and password (note that an upload certificate may also be used to authenticate the connection to the image repository).

3. The upload resumes from where it left off before the network connection problem was encountered.

Create a New Workload on Site Server 110 Using an Artifact from the Workload Image Library 141

This use case assumes that the artifact has already been uploaded to workload image library 141 and the site server 110 is already bootstrapped to cloud/server 140.

1. User logs onto cloud/server 140 and navigates to a 'System Page' for the intended site server 110 using interface 144.

2. User clicks the 'Add Service' button option within interface 144.

3. User completes necessary details for the new workload and selects the artifact from the workload image store 112 within interface 144.

4. The name, description and other metadata are shown to assist in selecting the correct artifact within interface 144.

5. If the artifact is not already present on the site server 110 the user will be prompted to confirm that it should be downloaded from cloud/server 140 within interface 144.

6. The download of the artifact will be added to the tail of the download queue by deployment manager 143.

7. Progress of the download together with estimated completion time will be displayed on the 'Service Page' for the new VM's service (workload's service) within interface 144.

8. Once the download of the artifact is complete the workload will automatically start if the Start button was selected by the user within the interface 144.

Pause all Downloads to a Site Server 110

This use case assumes one or more artifacts are in process and being downloaded to site server 110 by deployment manager 143 and the downloads need to be paused for a period of time; for example, because the site server 110 or network connection 130 is experiencing problems.

1. User logs onto cloud server 140 and navigates to the 'System list' screen using interface 144.
2. The user navigates to the site server 110 in question within interface 144.
3. User dicks the 'Pause downloads' button option within interface 144.
4. All in-progress downloads to the selected site server 110 are paused by deployment manager 143 and no new downloads will commence.

Resume all Downloads to a Site Server 110

This use case assumes downloads to a given site server 110 are paused and need to be resumed.

1. User logs onto cloud/server 140 and navigates to the 'System list' screen using interface 144.
2. The user navigates to the site server 110 in question within interface 144.
3. User dicks the 'Resume downloads' button option within interface 144.
4. All previously in-progress downloads are resumed by deployment manager 143 (when the image library 141 has bandwidth to start them) unless download of the artifact itself has been paused (see the use case described below for Pause all Downloads of an Artifact to all Site Servers 110).

Pause all Downloads of an Artifact to all Site Servers 110

This use case assumes one or more artifacts are in process of being downloaded to multiple site servers 110. The download of a particular artifact needs to be paused for a period of time; for example, because a higher priority artifact needs to be downloaded or the correctness of the artifact is in question.

1. User logs onto cloud/server 140 and navigates to the 'Image Library' screen using interface 144.
2. The user navigates to the artifact in question within interface 144.
3. User clicks the 'Pause downloads' button option within interface 144.
4. All in-progress downloads for the artifact are paused on all site servers 110 by deployment manager 143.

Resume all Downloads of a Particular Artifact

This use case assumes downloads of an artifact are paused and need to be resumed.

1. User logs onto cloud/server 140 and navigates to the 'Image Library' screen using interface 144.
2. The user navigates to the artifact in question within interface 144.
3. User clicks the 'Resume downloads' button within interface 144.
4. All previously in-progress downloads are resumed by deployment manager 143 (when the image library 141 has bandwidth to start them) unless download to a particular site server 110 has been paused—see Pause all Downloads to a Site Server 110 above.

Cancel Download of a Particular Artifact

This use case assumes the download of an artifact to a site server 110 is in-progress or pending and the workload that is using the artifact is no longer required.

1. User logs onto cloud/server 140 and navigates to the 'System' screen for the site server 110 using interface 144.
2. The user navigates to the service page for the VM service in question within interface 144.
3. User clicks the 'Delete' button option within interface 144.
4. The download of the required artifact is cancelled and the workload definition is removed by image store manager 142 and deployment manager 143.

Define or Update Download Bandwidth Profile for a Site Server 110

This use case assumes one or more new site servers 110 are being provisioned within an enterprise, the network connections to image store 112 is limited and must not be overutilized by image downloads, and the bandwidth available for downloads varies over time; for example, more network resources can be consumed at night when stores associated with the sites are closed and when the site server 1120 is not being used or has less usage.

1. User includes a default image download bandwidth profile in the relevant deployment type using interface 144.
2. User can override the default by specifying changes on a provisioning page of the cloud/server 140, or afterwards on the system's page of the cloud server 140.
3. Once deployed the system 100 respects the specified bandwidth limits whenever an image download takes place by throttling the download.
4. The same bandwidth limitations are applied to image downloads and/or patch downloads and both cannot take place at the same time.

View where an Artifact has been Downloaded

This use case assumes one or more site servers 110 have been deployed and one or more artifacts have been downloaded to the site servers 110.

1. User navigates to the Image Library page of cloud/server 140 using interface 144.
2. User locates the version of the artifact in the list of artifacts using interface 144.
3. User clicks on the artifact and the Artifact Details page is displayed within interface 144.
4. The page shows the list of site servers 110 on which the artifact has been downloaded or is pending/in-progress within interface 144.
5. The page also shows whether an artifact is still in-use on a site server 110 or has been detached from all workloads.

View the Artifacts Available on a Specific Site Server 110

This use case assumes one or more site servers 110 have been deployed and one or more artifacts have been downloaded to the site servers 110.

1. User navigates to the System page of the cloud/server 140 for the system 100 they are interested in using interface 144.

2. The page shows the list of artifacts available on the site server 110 together with any artifacts pending or currently downloading within interface 144.

User Purges Artifacts that are No Longer Required from the Library 141

This use case assumes one or more artifacts have been uploaded to the library 141.

1. User navigates to the Image Library page of the cloud-server 140.

2. User selects the artifact to be purged using interface 144.

3. If the artifact is required by any in-progress or pending downloads the 'Delete' button is disabled by interface 144.

4. If the button is enabled and pressed the user is prompted to confirm that the artifact should be deleted within interface 144.

5. The artifact is deleted from the library 141 but it's history and metadata are retained by workload image store manager 142.

6. The artifact has its status changed to 'Archived' by workload image store manager 142.

User Detaches a Site Server 110 from a Deployed VM (One Workload Type)

The use case assumes a VM (one type of workload) has been created on a site server 110 using an International Standard Organization (ISO) download from library 141 and the ISO download is no longer required to boot the VM.

1. User navigates to the System page of cloud/server 140 for the site server 110 they are interested in using interface 144.

2. The user selects the Service for the VM (workload) they are interested in using interface 144.

3. The user presses the 'Detach ISO on next boot' button option within interface 144 and the ISO download is removed from the VM configuration by workload image store manager 142.

4. On the next reboot of the VM the ISO download is not attached to the VM.

User Re-Attaches an ISO Download to a Deployed VM (One Type of Workload)

This use case assumes a VM (one type of workload) has been created on a site server 110 using an ISO download from the library 141 and the ISO download was removed from the VM by mistake and needs to be re-attached.

1. User navigates to the System page of the cloud/server 140 for the site server 110 they are interested in using interface 144.

2. The user selects the Service for the VM they are interested in using interface 144.

3. The user presses the 'Attach ISO on next boot' button option and the ISO download is re-added to the VM configuration by workload image store manager 143.

4. On the next reboot of the VM the ISO download are re-attached to the VM.

User Marks an ISO for Auto-Detach after First Boot

This use case assumes a VM (one type of workload) has been created on a site server 110 using an ISO download from the library 141 and the ISO download is only requested for the first boot of the VM on a device 120.

1. User navigates to the System page of the cloud/server 140 for the site server 110 they are interested in using interface 144.

2. User clicks the 'Add Service' button option within interface 144.

3. User completes necessary details for the new workload and selects the artifact from the library using interface 144.

4. User checks the 'Auto-detach after first boot' checkbox option within interface 144.

5. Once the download of the ISO download is complete the workload (VM) will automatically start if the Start button option was clicked within interface 144.

6. After successful boot on a device 120 the ISO download is removed from the VM configuration so that it is not present on the next boot.

User Purges Artifacts that are No Longer Required from One or More Site Servers 110

This assumes one or more site servers 110 have been deployed and the artifacts are no longer needed by the site servers 110.

1. User navigates to the Image Library page of cloud/server 140 using interface 144.

2. User selects the artifact to be purged within interface 144. Note that the artifact may be archived if already removed from the library 141.

3. User clicks on the artifact and the Artifact Details page is displayed within interface 144.

4. The page shows the list of site servers 110 on which the artifact has been downloaded or is pending.

5. User selects the site servers 110 from which the artifact should be removed and clicks the 'Delete' button option within interface 144.

6. The user is presented with a dialogue to confirm they wish to remove the artifact from the selected site servers 110 within interface 144.

7. The artifact is removed from all selected site servers 110 if it is no longer being used by (attached to) any VMs (workloads) by remote workload image store manager 142.

Promotion of Images into Production

This use cases assumes an image has been tested in a development environment and is ready to test in Quality Assurance (QA) and put into production.

1. User encrypts the artifact with a production key using interface 113 and workload manager 111.

2. User uploads the artifact to the library 141 using interface 144 and remote workload image store manager 142 and designates the artifact as being QA.

3. User deploys and tests the artifact using deployment manager 143, workload agents 123, and devices 120 that are designated as testing devices 120.

4. User navigates to the Image Library page of cloud server 140 using interface 144 and selects the artifact that is designated as being QA.

5. User presses the 'Export library' button option and selects the production identification for the artifact within library 141 using interface 144.

6. The artifact is designated within the library 141 as production ready.

Note that this use case assumes that the QA environment is considered as security sensitive as the production environment and can share the same set of production certificates and signing keys. It is expected that the customer will also have one or more development environments with a lower level of security and therefore different and more widely known keys. The devices 120 may be designated as QA, testing, development, and/or production devices 120.

Pre-Download of an Artifact

This use case assumes a new artifact has been uploaded to library 141 and it is anticipated that the artifact will be required on all site servers 110 but no specific workload using the artifact will be created yet.

1. User logs onto cloud/server and navigates to the 'Image Library' screen using interface 144.
2. The user navigates to the artifact in question using interface 144.
3. User clicks the 'Download Now' button option within interface 144.
4. Download of the artifact to all site servers 110 is scheduled ahead of the creation of any specific workloads using the artifact by deployment manager 143.

Expedite Selected Downloads from Library 141

This use case assumes one or more artifacts are in process of being downloaded and a new version of an artifact needs to be downloaded urgently to resolve a security issue.

1. User logs onto cloud/server 140 and navigates to the 'Image Library' screen using interface 144.
2. User can see a list of all artifacts present in the library within interface 144.
3. User clicks the 'Download Queue' button option within interface 144.
4. The Download Queue screen lists the following information for each download: artifact name, artifact version, target site server download status, and the download progress and the estimated time to completion.
5. User filters the list to see only the pending downloads for the new artifact version using interface 144.
6. User selects all the displayed downloads using interface 144.
7. User clicks the 'Move to top' button option within interface 144 so that the pending downloads are moved to the head of the queue by deployment manager 143.
8. User clicks 'Save' to save the change within interface 144.
10. All in-progress downloads are suspended and the new downloads at the head of the queue are started by deployment manager 143.

Deprioritize Selected Downloads

This use case assumes one or more artifacts are in the processing of being downloaded and the downloads of a particular artifact are deemed lower priority than others behind them in the queue.

1. This is the same as the Expedite Selected Download from Library to a Site Server 110 (discussed above) but instead of clicking the 'Move to top' button option within interface 144 the 'Move to bottom' button option is clicked within interface 144.

2. If any of the downloads were in-progress they are suspended, and all selected downloads are moved to the tail of the download queue by deployment manager 143.

Pause Specific Downloads

This use case assumes one or more artifacts are in the processing of being downloaded and a problem has been detected in production with VMs (workloads) based upon the artifact.

1. User logs onto cloud/server 140 and navigates to the 'Download Queue' screen using interface 144.
2. User filters the list to see all pending downloads for the artifact using interface 144.
3. User selects all the displayed downloads within interface 144.
4. User clicks the 'Pause' button option within interface 144 so that the pending downloads are temporarily suspended by deployment manager 143.
5. User clicks 'Save' to save the change within interface 144.
6. The selected downloads are suspended and the next non-paused downloads at the head of the queue are started by deployment manager 143.

Resume Previously Paused Downloads

This use case assumes one or more downloads have been paused and a reason for pausing them has been resolved and the downloads should be resumed.

1. User logs onto cloud/server 140 and navigates to the 'Download Queue' screen using interface 144.
2. User filters the list to see all paused downloads using interface 144.
3. User selects all the paused downloads within interface 144.
4. User clicks the 'Resume' button option within interface 144 so that the paused downloads are resumed by deployment manager 143.
5. User clicks 'Save' to save the change within interface 144.
6. The selected downloads continue downloading from where they were suspended once any downloads ahead of them in the queue have completed.

View Historical Downloads

This use case assumes one or more artifacts have been downloaded from library 141.

1. User logs onto cloud/server 140 and navigates to the 'Download Queue' screen using interface 144.
2. The user filters the download status to include only downloads that are 'complete' using interface 144.
3. The Download Queue screen lists the same information as the Expedite Selected Downloads to Library use case except: estimated time to completion is replaced by the actual download completion time.
4. By default, downloads are ordered according to when they finished with the most recent at the top of the list by deployment manager 143.

System 100 provides a decentralized data center with centralized cloud-based workload image and artifact control. Each data center comprising one or more site servers 110. Each data center having its own workload image store 112 linked with library 141 of cloud/server 140. Each site server 110 controlling or managing one or more devices 120. The devices may be segmented as development, QA, testing, and/or production. Published versions of workload images and artifacts are managed in library 141 from cloud/server 140. Cloud/Server 140 manages the workload images and artifacts as encrypted blocks of data, each block having a unique digital signature. The encryption keys are never possessed by or never available to cloud/server 140, which ensures that each enterprise's data center of workloads and artifacts are securely stored, managed, and distributed in an efficient manner because only specific changed encrypted blocks are distributed when workload images and/or artifacts require distribution to devices 120 of the enterprise. This substantially improves the bandwidth associated with distributing workload images and artifacts and the installation time on each of the devices 120. Moreover, bandwidth associated with distributing any block or set of blocks can be dynamically throttled up or down and can be processed in accordance with enterprise-defined bandwidth usage conditions. Still further, interfaces 113 and 144 are provided to permit developers to perform a variety of management features during administration of workload images and artifacts to devices 120 of a given enterprise.

In an embodiment, library 141 retains a record of all the artifacts and their corresponding encrypted block identifiers, which have ever been delivered to any of the site servers 110. This is used to decide what is needed to be sent to each site server 110 for a download of a given artifact or image. So, the site servers 110 do not have to be queried for a list of current block identifiers for current artifacts and/or images on those site servers 110. This avoids the need to upload the list of all artifacts and their block identifiers from the site servers 110, and this saves on bandwidth associated with sending the site list over connection 130. Moreover, since upload bandwidth is often slower than download bandwidth, this avoids requiring any upload bandwidth and ensures that a site's existing inventory of block identifiers for its artifacts and images are always known and available to determine in any given circumstance what is needed by a given site server 110.

These and other embodiments are now discussed with reference to FIGS. 2-4.

Figure 2:
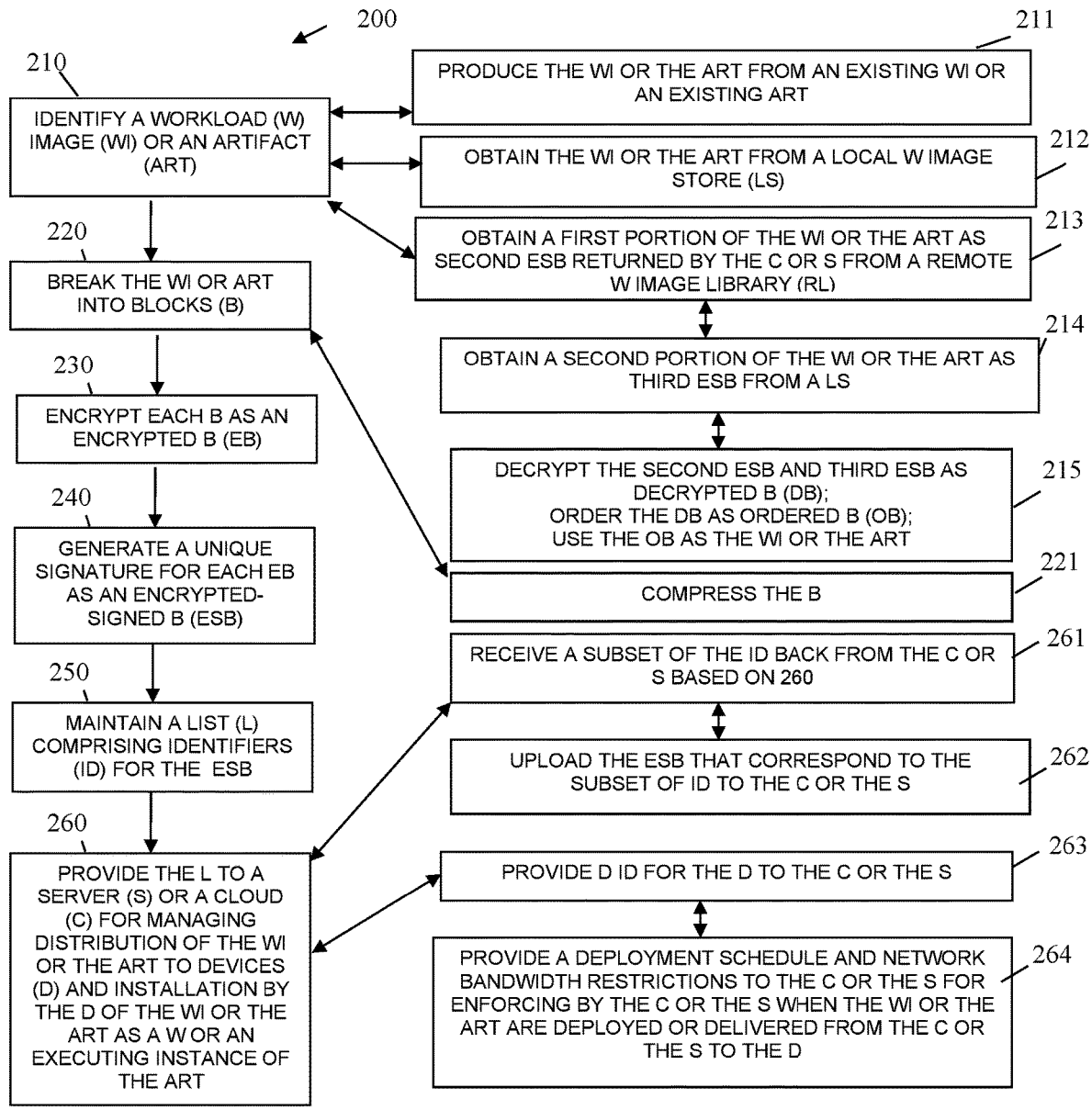
FIG. 2 is a diagram of a method for secure workload image distribution and management, according to an example embodiment.

FIG. 2 is a diagram of a method 200 for secure workload image distribution and management, according to an example embodiment. The software module(s) that implements the method 200 is referred to as an "local site-based workload manager." The local site-based workload manager is implemented as executable instructions programmed and residing within memory and/or a non-transitory computer-readable (processor-readable) storage medium and executed by one or more processors of a device. The processor(s) of the device that executes the local site-based workload manager are specifically configured and programmed to process the local site-based workload manager. The local site-based workload manager has access to one or more network connections during its processing. The network connections can be wired, wireless, or a combination of wired and wireless.

In an embodiment, the device that executes the local site-based workload manager is site server 110.

In an embodiment, the local site-based workload manager is workload manager 111 and/or remote/local workload image store interface 113.

At 210, the local site-based workload manager identifies a workload image or an artifact.

In an embodiment, at 211, the local site-based workload manager produces the workload image or the artifact from an existing workload image or an existing artifact.

In an embodiment, at 212, the local site-based workload manager obtains the workload image or the artifact from a local workload image store 112.

In an embodiment, at 213, the local site-based workload manager obtains a first portion of the workload image or the artifact as a second encrypted and signed blocks returned by the cloud 140 or server 140 from a remote image library 141.

In an embodiment of 213 and at 214, the local site-based workload manager obtains a second portion of the workload image or the artifact as third encrypted and signed blocks from a local workload image store 112.

In an embodiment of 214 and at 215, the local site-based workload manager decrypts the second and third encrypted and signed blocks as decrypted blocks. The local site-based workload manager orders the decrypted blocks as ordered blocks, and the local site-based workload manager uses the ordered blocks as the workload image or the artifact.

At 220, the local site-based workload manager breaks the workload image or the artifact into blocks.

In an embodiment, at 221, the local site-based workload manager compresses the blocks.

At 230, the local site-based workload manager encrypts each block as an encrypted block.

At 240, the local site-based workload manager generates a unique signature for each encrypted block as an encrypted and signed block.

At 250, the local site-based workload manager maintains a list comprising identifiers for each of the encrypted and signed blocks.

At 260, the local site-based workload manager provides the list to the server 140 or the cloud 140 for managing distribution of the workload image or the artifact to devices and installation by the devices of the workload image or the artifact as a workload or as an executing instance of an artifact. It is noted that the list may not be required to be provided by the local site-based workload manager when the server 140 or the cloud 140 maintains a current inventory of artifacts and images sent to the local site-based workload manager. In such embodiments, the list is not provided as it is already known by the server 140 or the cloud 140.

In an embodiment, at 261, the local site-based workload manager receives a subset of the identifiers back from the cloud 140 or the server 140 based on 260.

In an embodiment of 261 and at 262, the local site-based workload manager uploads the encrypted and signed blocks that correspond to the subset of identifiers to the cloud 140 or the server 140.

In an embodiment, at 263, the local site-based workload manager provides device identifiers for the devices to the cloud 140 or the server 140.

In an embodiment of 263 and at 264, the local site-based workload manager provides a deployment schedule and network bandwidth restrictions to the cloud 140 or the server 140 for enforcing by the cloud 140 or the server 140 when the workload image or the artifact are deployed or delivered from the cloud 140 or the server 140 to the device 120.

Figure 3:
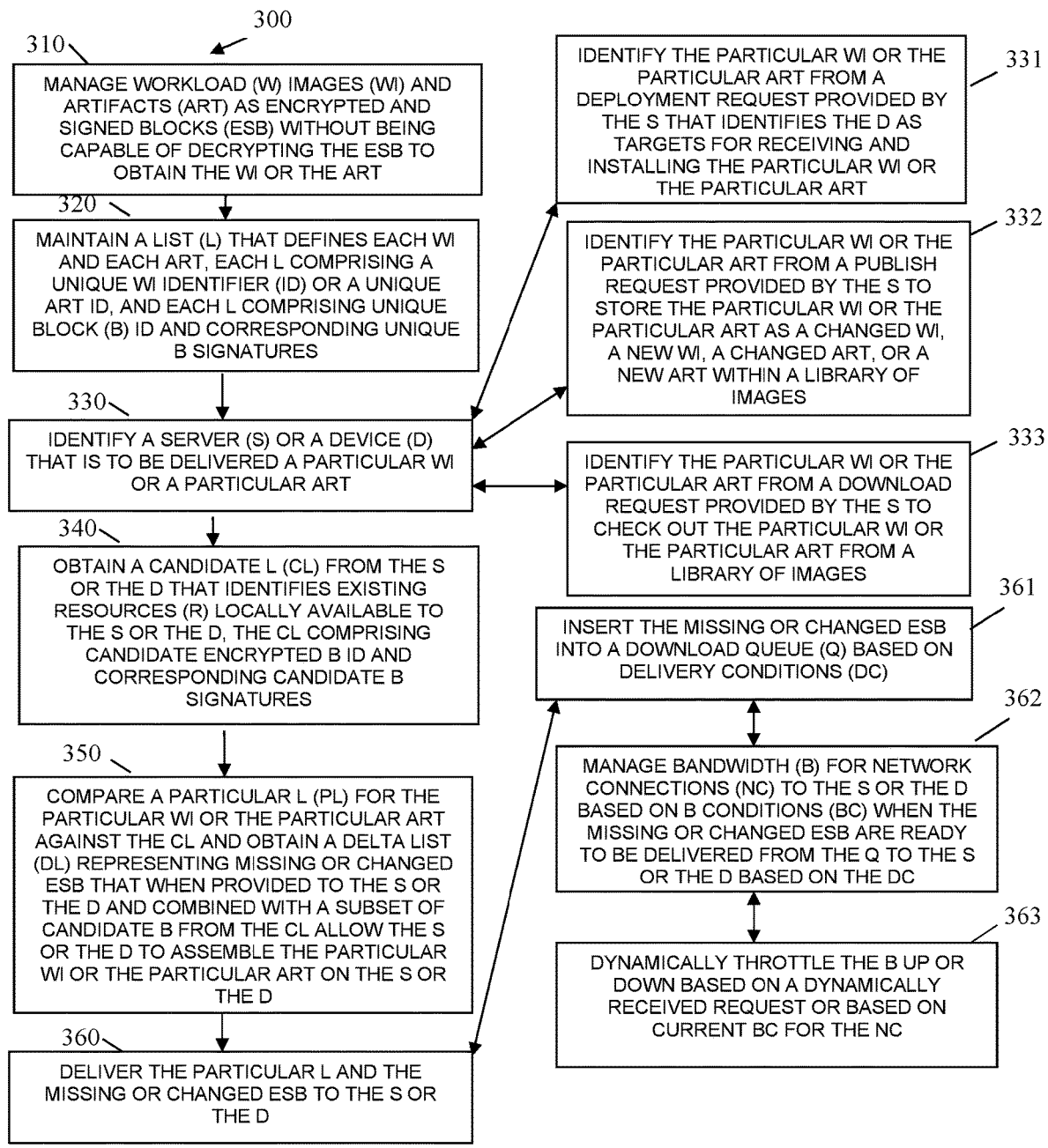
FIG. 3 is a diagram of another method for secure workload image distribution and management, according to an example embodiment.

FIG. 3 is a diagram of another method 300 for secure workload image distribution and management, according to an example embodiment. The software module(s) that implements the method 300 is referred to as a "cloud-based workload image manager." The cloud-based workload image manager is implemented as executable instructions programmed and residing within memory and/or a non-transitory computer-readable (processor-readable) storage medium and executed by one or more processors of a device. The processors that execute the cloud-based workload image manager are specifically configured and programmed to process the server-based cloud-based workload image manager. The cloud-based workload image manager has access to one or more network connections during its processing. The network connections can be wired, wireless, or a combination of wired and wireless.

In an embodiment, the device that executes the cloud-based workload image manager is server 140. In an embodiment, the device that executes cloud-based workload image manager is cloud 140, which comprises multiple servers cooperating with one another as a single server forming a single logical cloud processing environment.

In an embodiment, the cloud-based workload image manager is remote workload image store manager 142, workload image deployment manager 143, and/or remote workload image library interface 144.

The cloud-based workload image manager interacts with site servers 110 over network connections, each site server 110 executing method 200 of FIG. 2. Moreover, cloud-based workload image manager interacts with devices 120 over network connections, each device 120 executing workloads and workload agent 123.

At 310, the cloud-based workload image manager manages workload images and artifacts as encrypted and signed blocks without being capable of decrypting the encrypted and signed blocks to obtain the workload image or the artifact.

At 320, the cloud-based workload image manager maintains a list that defines each workload image and each artifact. Each list comprising a unique workload identifier or a unique artifact identifier, and each list comprising unique block identifiers and corresponding unique block signatures for each specific block identifier.

At 330, the cloud-based workload image manager identifies a server or a device that is to be delivered a particular workload image or a particular artifact.

In an embodiment, at 331, the cloud-based workload image manager identifies the particular workload image or the particular artifact from a deployment request provided by the server that identifies the device as a target for receiving and installing the particular workload image or the particular artifact.

In an embodiment, at 332, the cloud-based workload image manager identifies the particular workload image or the particular artifact from a publish request provided by the sever to store the particular workload image or the particular artifact as a changed workload image, a new workload image, a changed artifact, or a new artifact within a library of images.

In an embodiment, at 333, the cloud-based workload image manager identifies the particular workload image or the particular artifact from a download request provided by the server to check out the particular workload image or the particular artifact from a library of images.

At 340, the cloud-based workload image manager obtains a candidate list from the server of the device that identifies existing resources locally available to the server or the device. The candidate list comprising candidate encrypted block identifiers and corresponding candidate block signatures.

At 350, the cloud-based workload image manager compares a particular list for the particular workload image or the particular artifact against the candidate list and obtains a delta list representing missing or changed encrypted and signed blocks that when provided to the server or the device and combined with a subset of candidate blocks from the candidate list allow the server or the device to assemble the particular workload image or the particular artifact on the server or the device.

At 360, the cloud-based workload image manager delivers the particular list and the missing or changed encrypted and signed blocks to the server or the device.

In an embodiment, at 361, the cloud-based workload image manager inserts the missing or changed encrypted and signed blocks into a download queue based on delivery conditions.

In an embodiment of 361 and at 362, the cloud-based workload image manager manages bandwidth for network connections to the server or the device based on bandwidth conditions when the missing or changed encrypted and signed blocks are ready to be delivered from the download queue to the server or the device based on the delivery conditions.

In an embodiment of 362 and at 363, the cloud-based workload image manager dynamically throttles the bandwidth up or down based on a dynamically received request or based on current bandwidth conditions for the network conditions.

Figure 4:
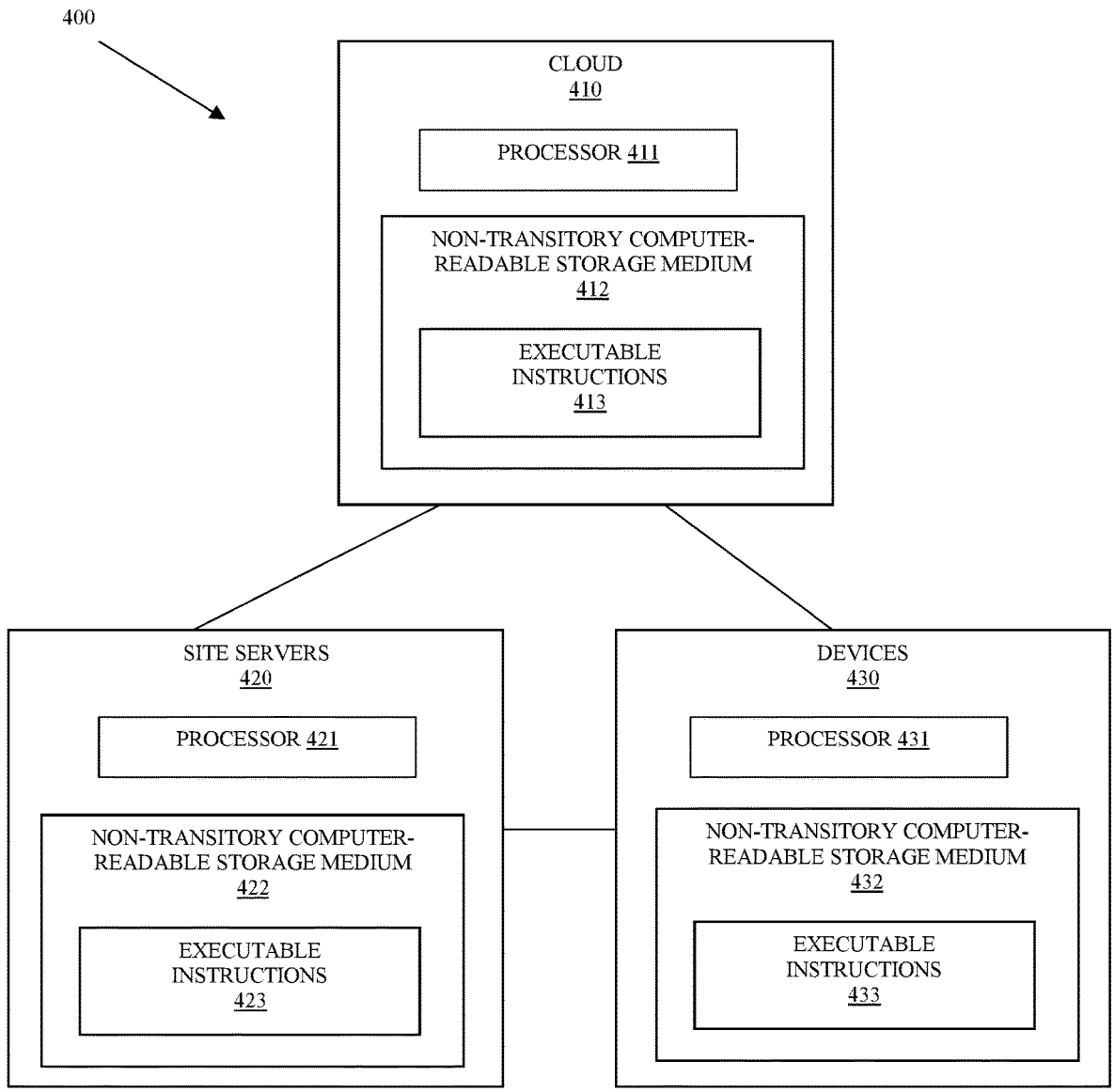
FIG. 4 is a diagram of another system for secure workload image distribution and management, according to an example embodiment.

FIG. 4 is a diagram of another system 400 for secure workload image distribution and management, according to an example embodiment. The UPS 400 includes a variety of hardware components and software components. The software components of the system 400 are programmed and reside within memory and/or a non-transitory computer-readable medium and execute on one or more processors of the system 400. The UPS 400 communicates over one or more networks, which can be wired, wireless, or a combination of wired and wireless.

In an embodiment, the system 400 implements, inter alia, the processing described above with respect to system 100, method 200, and method 300.

The system 400 is the system 100.

The system 400 includes a cloud 410, site servers 420, and devices 430. The cloud comprises a processor 411 and a non-transitory computer-readable storage medium 412 comprising executable instructions 413. Each site server 420 comprises a site processor 421 and a site non-transitory computer-readable storage medium 422 comprising site executable instructions 423. Each device 430 comprises a device processor 431 and a device non-transitory computer-readable storage medium 432 comprising device executable instructions 433.

The cloud executable instructions 413 when executed by the processor 411 from the non-transitory computer-readable storage medium 412 cause the processor 411 to perform processing comprising: 1) managing workload images and artifacts as encrypted and signed blocks provided from the site servers 420; 2) determining delta blocks missing from a given site server 420 or a given device 430 when given workload images or given artifacts are to be provided to the given site server 420 or the given device 430 with download requests and distribution requests received from the given site server 420; and 3) managing delivery of the delta blocks to the given site server 420 or the given device 430 based on delivery conditions and bandwidth restrictions.

In an embodiment, the executable instructions 413 is all of or some combination of: workload image store manager 142, workload image deployment manager 143, remote workload image library interface 144, and/or the method 300 of FIG. 3.

Each set of site executable instructions 423 when executed by the corresponding site-server processor 421 from the corresponding site-server non-transitory computer-readable storage medium 422 causes the corresponding site-server processor 421 to perform processing comprising: 1) uploading the encrypted and signed blocks associated with each workload image or each artifact to the cloud 410 when requested by the executable instructions 413 of the cloud 410 indicating that the encrypted and signed blocks are missing from the cloud 410; 2) making the download requests of the executable instructions 413 for the given workload images or the given artifacts; 3) making the distribution requests of the executable instructions 413 for the given workload images or the given artifacts and providing with the distribution requests device identifiers for the devices 430; and 4) providing the delivery conditions and the bandwidth restrictions to the executable instructions 413 for the given workload images or the given artifacts.

In an embodiment each set of site executable instructions 423 is all of or some combination of: workload manager 111, remote/local workload image store interface 113, and/or the method 200 of FIG. 2.

Each set of device executable instructions 433 when executed by the corresponding device processor 431 from the corresponding device non-transitory computer-readable storage medium 432 causes the corresponding device processor 431 to perform processing comprising: 1) receiving corresponding delta blocks associated with the given workload images or the given artifacts from the executable instructions 413 of the cloud 410; 2) decrypting the corresponding delta blocks as decrypted blocks; 3) obtaining existing blocks corresponding to the given workload images or the given artifacts; 4) assembling the existing blocks and the decrypted blocks as the given workload images or the given artifacts; and 5) installing the given workload images as workloads or the given artifacts as executable instances of the artifacts.

In an embodiment each set of device executable instructions 433 is workload agent 123.

In an embodiment, each site server 420 is associated with a select grouping of the devices 430.

For any embodiment presented herein and above for system 100, method 200, method 300, and/or system 400, a "device" can be any computing device including a server, a desktop, a tablet, a Self-Service Terminal, a Point-Of-Sale Terminal, a laptop, a phone, a television, a wearable processing device, a peripheral device having computing hardware and capabilities, and/or an intelligent appliance that is part of the Internet-of-Things (IoTs).

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    managing workload images and artifacts as encrypted and signed blocks without being capable of decrypting the encrypted and signed blocks to obtain the workload images and the artifacts;
    maintaining a list that defines each workload image and each artifact, each list comprising a unique workload image identifier or a unique artifact identifier, and each list comprising unique block identifiers and corresponding unique block signatures;
    identifying a server or a device that is to be delivered a particular workload image or a particular artifact;
    obtaining a candidate list from the server or the device that identifies existing resources locally available to the server or the device, the candidate list comprising candidate encrypted block identifiers and corresponding candidate block signatures;
    comparing a particular list for the particular workload or the particular artifact against the candidate list and obtaining a delta list representing missing or changed encrypted and signed blocks that when provided to the server of the device and combined with a subset of candidate blocks from the candidate list allow the server or the device to assemble the particular workload image or the particular artifact on the server of the device; and
    delivering the particular list and the missing or changed encrypted and signed blocks to the server or the device.

2. The method of claim 1, wherein identifying further includes identifying the particular workload image or the particular artifact from a deployment request provided by the server that identifies the device as a target for receiving and install the particular workload image or the particular artifact.

3. The method of claim 1, wherein identifying further includes identifying the particular workload image or the particular artifact from a publish request provided by the server to store the particular workload image or the particular artifact as a changed workload image, a new workload image, a changed artifact, or a new artifact within a library of images.

4. The method of claim 1, wherein identifying further includes identifying the particular workload image or the particular artifact from a download request provided by the server to check out the particular workload image or the particular artifact from a library of images.

5. The method of claim 1, wherein delivering further includes inserting the missing or changed encrypted and signed blocks into a download queue based on delivery conditions.

6. The method of claim 5, wherein inserting further includes managing bandwidth for network connections to the sever or the device based on bandwidth conditions when the missing or changed encrypted and signed blocks are ready to be delivered from the download queue to the server or the device based on the delivery conditions.

7. The method of claim 5, wherein managing the bandwidth further includes dynamically throttling the bandwidth up or down based on a dynamically received request or based on current bandwidth conditions for the network connections.

8. A system, comprising:
  a cloud comprising at least one processor and a non-transitory computer-readable storage medium having executable instructions representing an image deployment manager;
  site servers, each site server comprising a site-server processor and a site-server non-transitory computer-readable storage medium having site executable instructions representing a site image manager;
  devices, each device comprising a device processor and a device non-transitory computer-readable storage medium having device executable instructions representing an image agent;
  the executable instructions when executed by the at least one processor from the non-transitory computer-readable storage medium cause the at least one processor to perform processing comprising:
    managing workload images and artifacts as encrypted and signed blocks provided from the site servers;
    determining delta blocks missing from a given site server or a given device when given workload images or given artifacts are to be provided to the given site server or the given device with download requests and distribution requests received from the given site server; and
    managing delivery of the delta blocks to the given site server or the given device based on delivery conditions and bandwidth restrictions;
  each set of site executable instructions when executed by the corresponding site-server processor from the corresponding site-server non-transitory computer-readable storage medium causes the corresponding site-server processor to perform processing comprising:
    uploading the encrypted and signed blocks associated with each workload image or each artifact to the cloud when requested by the executable instructions of the cloud indicating that the encrypted and signed blocks are missing from the cloud;
    making the download requests of the executable instructions for the given workload images or the given artifacts;
    making the distribution requests of the executable instructions for the given workload images or the given artifacts and providing with the distribution requests device identifiers for the devices; and
    providing the delivery conditions and the bandwidth restrictions to the executable instructions for the given workload images or the given artifacts;
  each set of device executable instructions when executed by the corresponding device processor from the corresponding device non-transitory computer-readable storage medium causes the corresponding device processor to perform processing comprising:
    receiving corresponding delta blocks associated with the given workload images or the given artifacts from the executable instructions of the cloud;
    decrypting the corresponding delta blocks as decrypted blocks;
    obtaining existing blocks corresponding to the given workload images or the given artifacts;
    assembling the existing blocks and the decrypted blocks as the given workload images or the given artifacts; and
    installing the given workload images as workloads or the given artifacts as executable instances of the artifacts.

9. The system of claim 8, wherein each site server associated with a grouping of the devices.

* * * * *